United States Patent
Uhler et al.

(10) Patent No.: US 6,901,752 B2
(45) Date of Patent: Jun. 7, 2005

(54) EXHAUST PROCESSOR WITH VARIABLE TUNING SYSTEM AND METHOD OF OPERATING SUCH EXHAUST PROCESSOR

(75) Inventors: Gregory Allen Uhler, Columbus, IN (US); Kenneth Cook, Indianapolis, IN (US); Mehmet S. Ciray, Greenwood, IN (US)

(73) Assignee: Arvin Technologies, Inc., Troy, MI (US)

( * ) Notice: Subject to any disclaimer, the term of this patent is extended or adjusted under 35 U.S.C. 154(b) by 0 days.

(21) Appl. No.: 10/359,913

(22) Filed: Feb. 6, 2003

(65) Prior Publication Data

US 2003/0145585 A1 Aug. 7, 2003

Related U.S. Application Data

(63) Continuation-in-part of application No. 10/068,693, filed on Feb. 6, 2002, now Pat. No. 6,732,510.

(51) Int. Cl.[7] ............................................... F02B 27/02
(52) U.S. Cl. ........................... 60/312; 60/313; 60/314; 60/322; 60/324; 181/215; 181/219; 181/227; 181/241
(58) Field of Search .................... 60/312, 313, 314, 60/322, 323, 324; 181/212, 215, 216, 217, 219, 241, 227

(56) References Cited

U.S. PATENT DOCUMENTS

| 2,479,165 | A |   | 8/1949 | Jackson |
|---|---|---|---|---|
| 3,141,519 | A | * | 7/1964 | Bottum ...................... 181/241 |
| 3,253,676 | A | * | 5/1966 | Bottum ...................... 181/241 |
| 4,006,793 | A | * | 2/1977 | Robinson ..................... 184/53 |
| 5,283,398 | A | * | 2/1994 | Kotera et al. ............... 181/224 |
| 5,435,347 | A | * | 7/1995 | Gillingham ............ 137/599.09 |
| 5,502,283 | A | * | 3/1996 | Ukai et al. .................. 181/228 |
| 6,178,745 | B1 | * | 1/2001 | Meusen ........................ 60/312 |
| 6,508,331 | B1 | * | 1/2003 | Stuart .......................... 181/250 |

FOREIGN PATENT DOCUMENTS

| CH |       112462      | 1/1926 |   |
|---|---|---|---|
| DE |    200 18 827 U1  | 4/2001 |   |
| EP |    1 130 226 A2   | 9/2001 |   |
| FR |     1.261.203     | 4/1961 |   |
| JP |      57076220     | 5/1982 |   |
| JP |    403185210 A  * | 8/1991 | ................. 181/227 |

* cited by examiner

Primary Examiner—Binh Q. Tran
(74) Attorney, Agent, or Firm—Barnes & Thornburg

(57) ABSTRACT

An exhaust processor has an exhaust tube and a cover mounted for rotation at least partially around the exhaust tube to adjust the tuning frequency of the exhaust processor. A method of operating the exhaust processor is also disclosed.

20 Claims, 14 Drawing Sheets

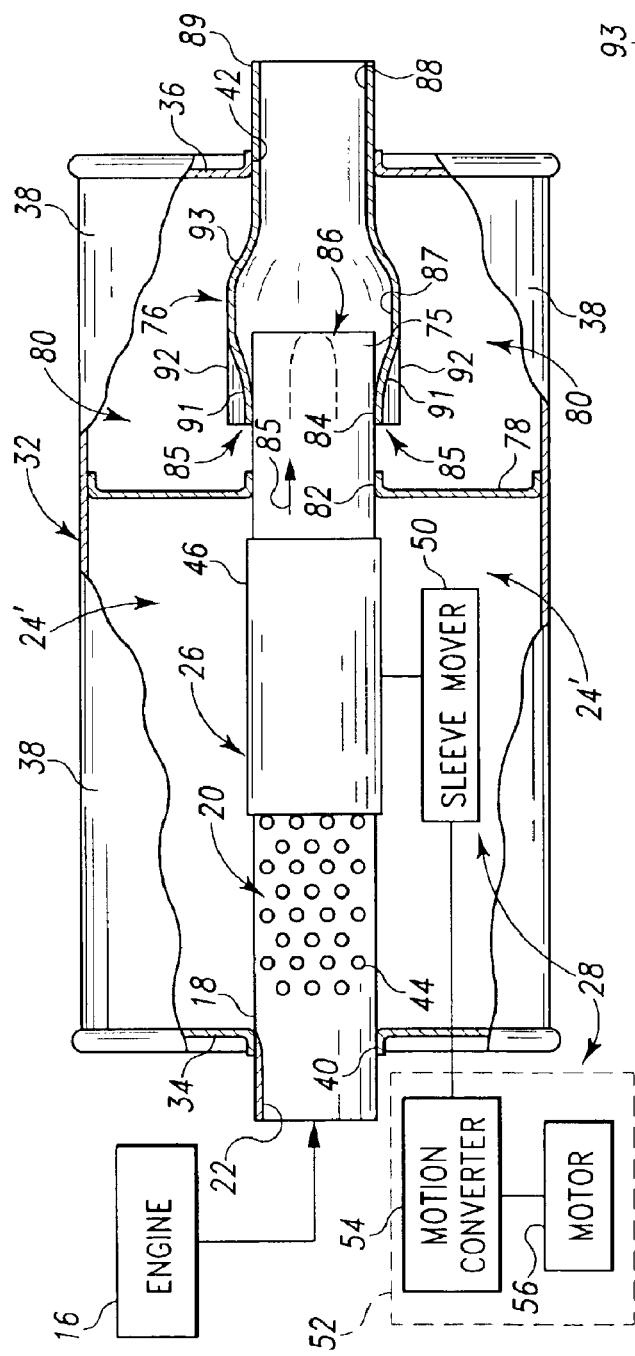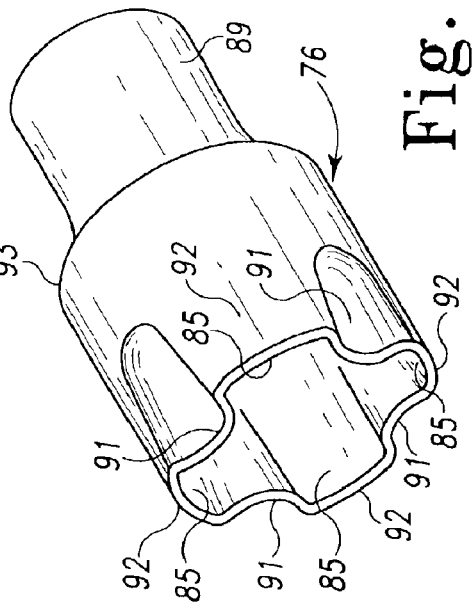
Fig. 8
Fig. 9

EXHAUST PROCESSOR WITH VARIABLE TUNING SYSTEM AND METHOD OF OPERATING SUCH EXHAUST PROCESSOR

This disclosure is a continuation-in-part of U.S. application Ser. No. 10/068,693 which was filed Feb. 6, 2002 now U.S. Pat. No. 6,732,510 and is hereby incorporated by reference herein.

BACKGROUND OF THE DISCLOSURE

This disclosure relates to an exhaust processor, and in particular, to an exhaust processor to attenuate noise associated with combustion product produced by an engine.

Noise in a vehicle exhaust system arises from acoustic waves that are generated by the sudden release of exhaust gases from individual cylinders in a vehicle engine. These acoustic waves travel from the engine exhaust manifold through a pipe to a muffler or other resonator on board the vehicle.

In order to dampen these acoustic waves to reduce the sound emitted by a vehicle, resonance chambers are provided in a muffler or other resonator to attenuate the acoustic waves. One type of resonance chamber is a Helmholtz resonator. A resonance chamber absorbs energy from the acoustic waves, which acts to silence somewhat the noise emitted from the muffler. Each resonance chamber is designed to "tune" or "silence" acoustic waves of a certain frequency.

SUMMARY OF THE DISCLOSURE

According to the present disclosure, an exhaust processor comprises an exhaust tube and a cover. The cover is mounted for rotation at least partially around the exhaust tube to adjust the tuning frequency of the exhaust processor to abate acoustic waves at the tuning frequency.

According to an aspect of the disclosure, the exhaust processor comprises a housing that defines an aperture. The exhaust tube extends through the aperture into the housing. The exhaust tube defines an exhaust tube opening positioned inside the housing for communication of acoustic waves between the housing and the exhaust tube. The cover is mounted for rotation at least partially around the exhaust tube over the exhaust tube opening to adjust the tuning frequency of the exhaust processor.

According to another aspect of the disclosure, the exhaust tube opening comprises a plurality of perforations for passage of acoustic waves therethrough and the cover comprises a sleeve defining a sleeve opening. The sleeve is mounted for rotation at least partially around the exhaust tube between first and second positions. In the first position, the sleeve opening is placed over a first number of the perforations to establish the tuning frequency of the exhaust processor at a first tuning frequency. In the second positions, the sleeve opening is placed over a second number of perforations to establish the tuning frequency of the exhaust processor at a second tuning frequency.

According to another aspect of the disclosure, a method of operating an exhaust processor comprises the step of rotating a cover at least partially around an exhaust tube over a number of perforations defined by the exhaust tube to adjust the tuning frequency of the exhaust processor.

The above and other features of the present disclosure will become apparent from the following description and the attached drawings.

BRIEF DESCRIPTION OF THE DRAWINGS

The detailed description particularly refers to the accompanying figures in which:

FIG. 8 is a view similar to FIG. 7 showing another illustrative exhaust processor wherein an outlet end of a perforated tuning exhaust tube carrying a movable sleeve is coupled to a low-frequency tuning exhaust tube communicating with a second static tuning volume located in the housing "alongside" an upstream first static tuning volume communicating with the perforated tuning tube;

FIG. 9 is an enlarged perspective view of the low-frequency tuning tube shown in FIG. 8;

DETAILED DESCRIPTION OF THE DRAWINGS

Figure 1:
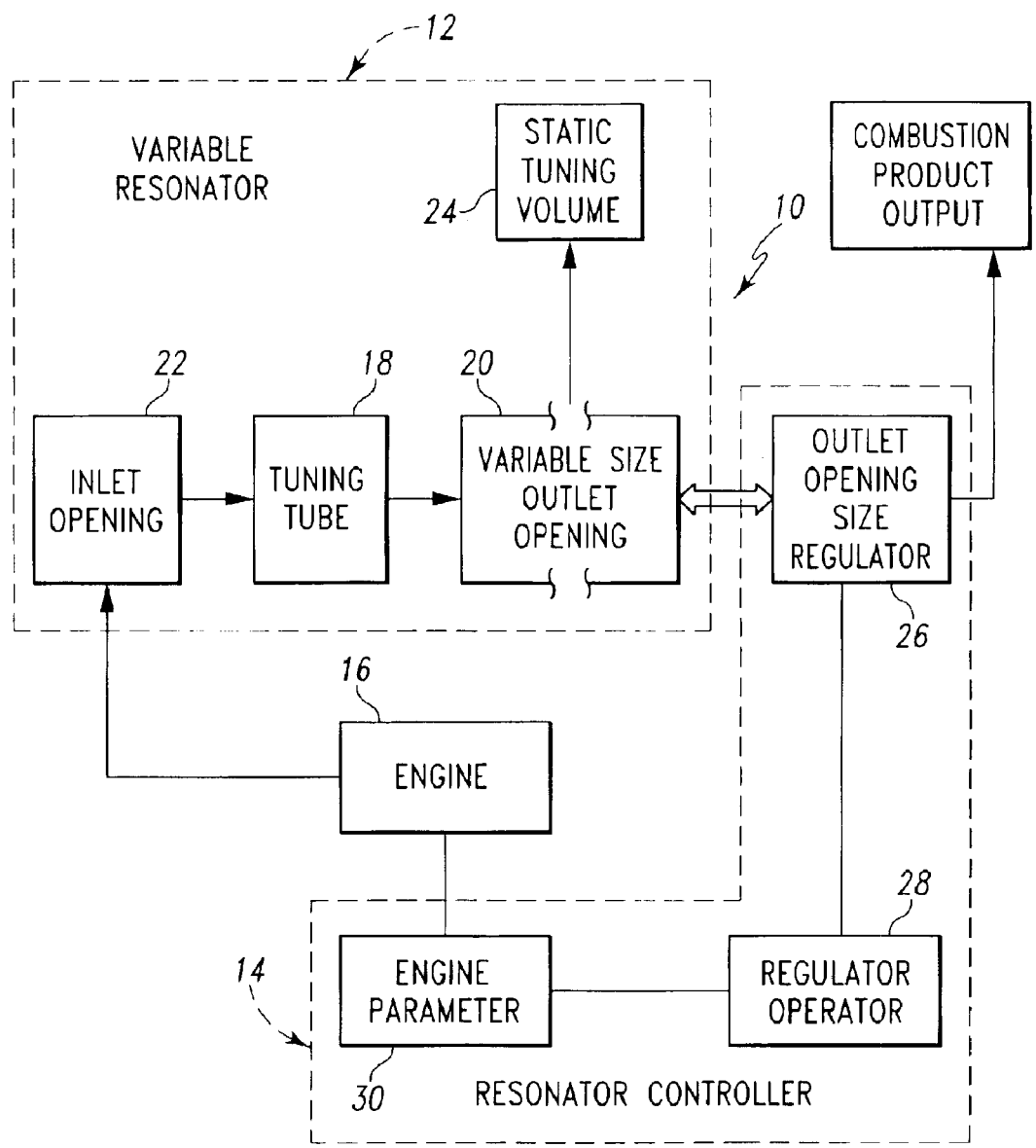
FIG. 1 is a diagrammatic view of an exhaust processor in accordance with the present disclosure showing a variable resonator configured to conduct combustion product exhausted by an engine through a tuning exhaust tube and a resonator controller that monitors an engine parameter (e.g., engine r.p.m.) and causes the size of the outlet opening from the tuning tube into a static tuning volume to vary continuously as a function of that engine parameter during engine operation so that the "effective length" of the tuning tube coupled to the static tuning volume is varied to attenuate noise associated with engine combustion product in accordance with a predetermined criteria.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

An exhaust processor 10 comprising a variable acoustic resonator 12 and a resonator controller 14 functions to silence or quiet noise associated with combustion product generated by engine 16. As suggested in FIG. 1, resonator 12 includes a tuning exhaust tube 18 provided with a variable size outlet opening 20 to communicate acoustic waves associated with engine combustion product admitted into tuning tube 18 through inlet opening 22 to a Helmholtz resonance chamber established by static tuning volume 24. Resonator controller 14 functions to change the size of outlet opening 20 during operation of engine 16 by moving an outlet opening size regulator 26 over outlet opening 20 in tuning tube 18. This movement of regulator 26 increases or decreases the size of outlet opening 20 under the control of a regulator operator 28 that senses an engine parameter 30 (e.g., engine r.p.m.) of engine 16 and moves regulator 26 in response to real-time changes in engine parameter 30 that occur during operation of engine 16 so as to vary the size of outlet opening 20 during engine operation to "tune" or "silence" acoustic waves associated with engine combustion product extant in tuning tube 18. Tunable acoustic systems are disclosed in U.S. Pat. Nos. 5,930,371 and 4,539,947. Those disclosures are hereby incorporated by reference herein.

Figure 2:
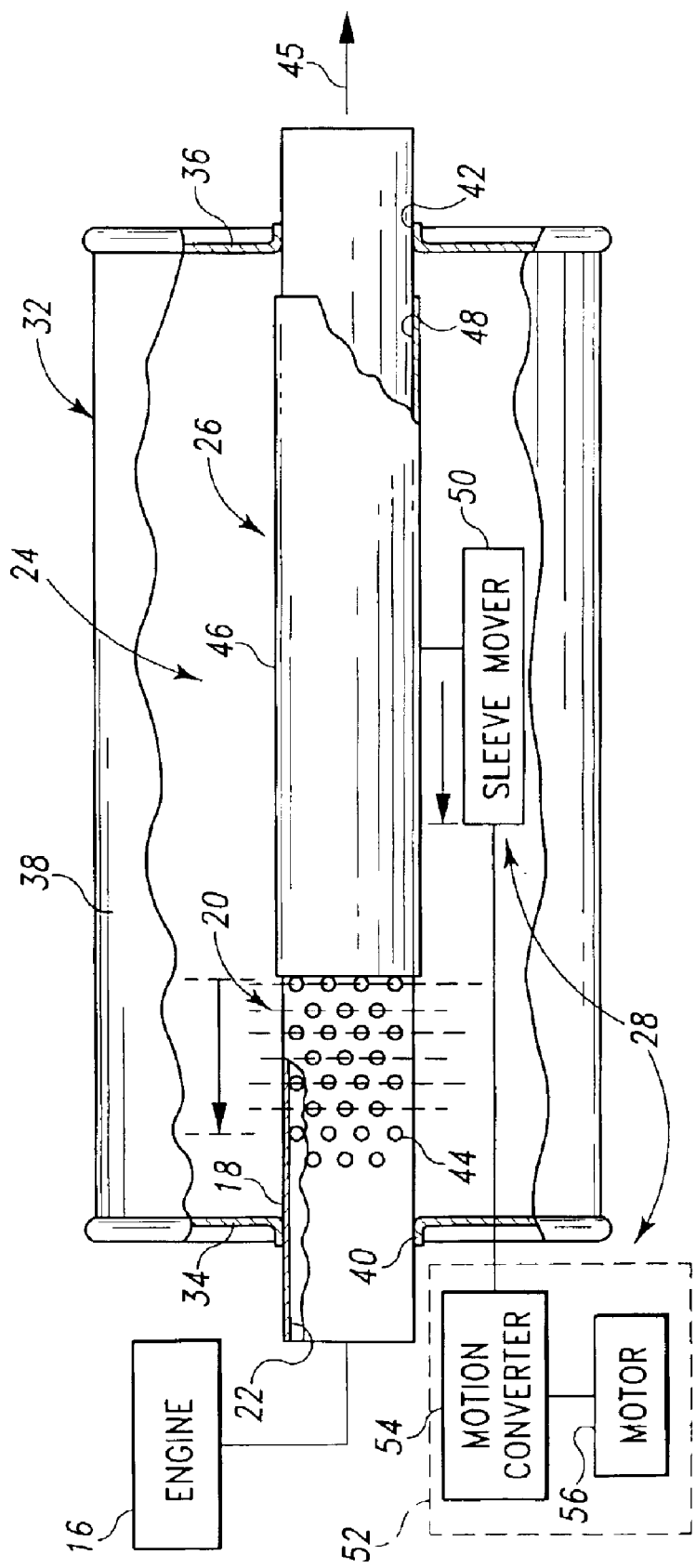
FIG. 2 is a side elevation view of an illustrative exhaust processor of the type diagrammed in FIG. 1, with portions broken away, showing a variable resonator including a static tuning volume provided by an exhaust processor housing and a perforated tuning exhaust tube extending through the housing and a resonator controller including an outlet opening size regulator comprising a sleeve that can move back and forth on the perforated tuning tube to vary the number of tuning tube perforations "open" to the static tuning volume provided in the housing around the perforated tuning tube so as to vary the size of the tuning tube "outlet opening" and thus the effective length of the tuning tube and a regulator operator comprising a motor, a sleeve mover, and a motion converter configured to reciprocate the sleeve mover in response to rotation of a shaft included in the motor, and showing that the sleeve has been moved to a fully extended position exposing eight rows of perforated openings.
Figure 3:
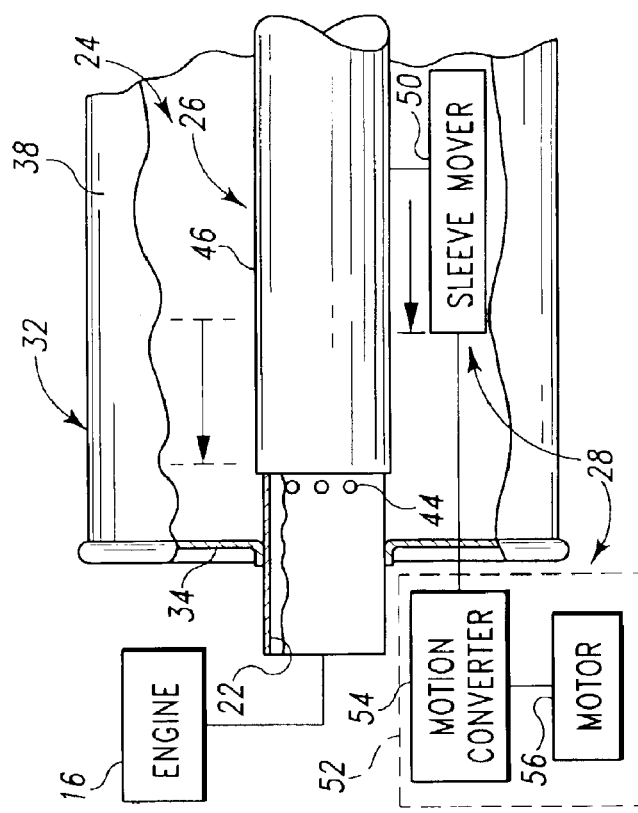
FIG. 3 is a view similar to FIG. 2 showing that the sleeve has been moved to a fully retracted position exposing one row of perforated openings.
Figure 4:
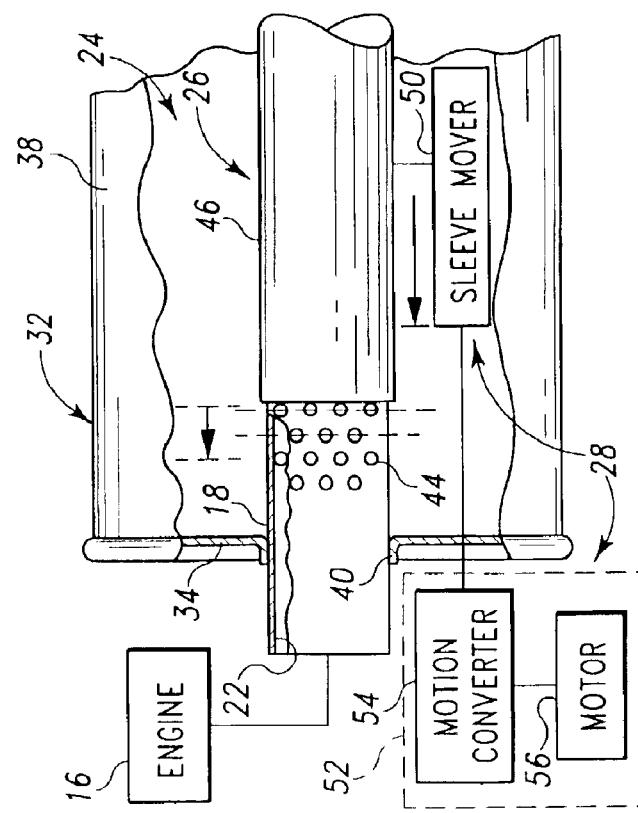
FIG. 4 is a view similar to FIGS. 2 and 3 showing that the sleeve has been moved to a midway position to increase the effective length of the tuning tube by exposing four rows of perforated openings.

In an illustrative embodiment, a tuning exhaust tube 18 extends into a static tuning volume 24 provided in a resonator housing 32 as shown, for example, in FIGS. 2–4. Housing 32 includes first and second end walls 34, 36 and a side wall 38 arranged to extend from first end wall 34 to second end wall 36. An inlet end of tuning tube 18 extends through an aperture 40 formed in first end wall 34 and an outlet end of tubing tube 18 extends through an aperture 42 formed in second end wall 36. A field of perforations 44 arranged, for example, in longitudinally spaced-apart annular rows, is formed in tuning tube 18 to define outlet opening 20. Acoustic waves (not shown) associated with combustion product (not shown) in tuning tube 18 are communicated to static tuning volume 24 in housing 32 via opened perforations 44 in the perforation field. Combustion product discharged from tuning tube 18 is discharged therefrom in direction 45 to a downstream destination.

A sleeve 46 formed to include a longitudinal passageway 48 receiving tuning tube 18 therein is mounted for back-and-forth (or other) movement on tuning tube 18 in static tuning volume 24 to open and close perforations 44 so as to increase or decrease the effective size of outlet opening 20. Regulator operator 28 comprises a sleeve mover 50 coupled to sleeve 46 and a mover driver 52 coupled to sleeve mover 50. Mover driver 52 comprises, for example, a motor 54 and a motion converter 56 for converting an output (e.g., rotary movement of a drive shaft) of motor 52 into reciprocating movement of sleeve mover 50. In one embodiment, motion converter 56 is a rack-and-pinion mechanism of the type suggested diagrammatically in FIG. 5.

In operation, sleeve 46 can be moved by regulator operator 28 to open a maximum number of perforations 44 (so as to maximize the size of outlet opening 20) as shown, for example, in FIG. 2 or close most of perforations 44 (so as to minimize the size of outlet opening 20) as shown, for example, in FIG. 3. By leaving at least one perforation 44 open (or uncovered by sleeve 46), acoustic waves associated with engine combustion product in tuning tube 18 are transmitted into the static tuning volume 24 around tuning tube 18. Sleeve 46 is positioned to open eight annular rows of perforations 44 in FIG. 2, one annular row of perforations 44 in FIG. 1, and four annular rows of perforations 44 in FIG. 4. It is within the scope of this disclosure to position sleeve 46 relative to the field of perforations 44 so that movement of sleeve 46 to the right (in FIG. 2) decreases the size of outlet opening 20.

Figure 5:
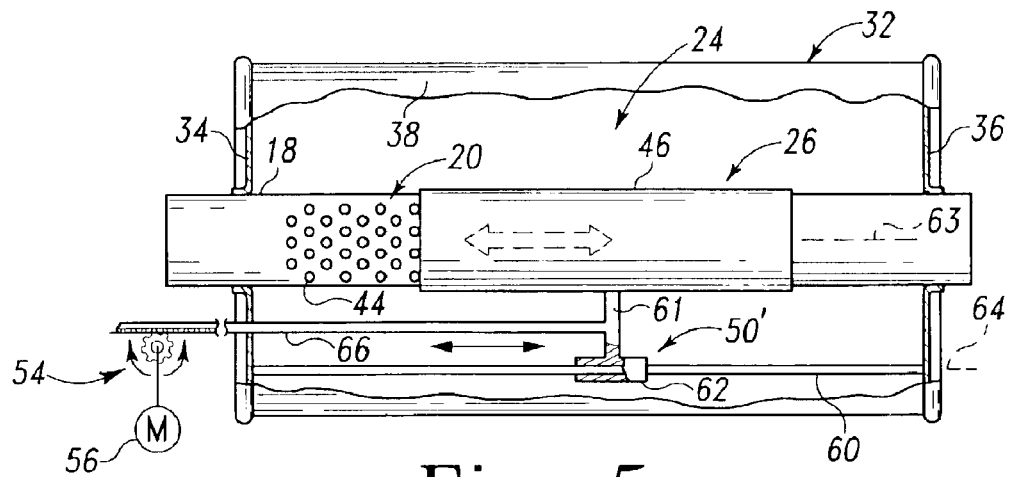
FIG. 5 is a view similar to FIG. 3 showing an illustrative embodiment of a motion converter and a first illustrative embodiment of a sleeve mover.
Figure 6:
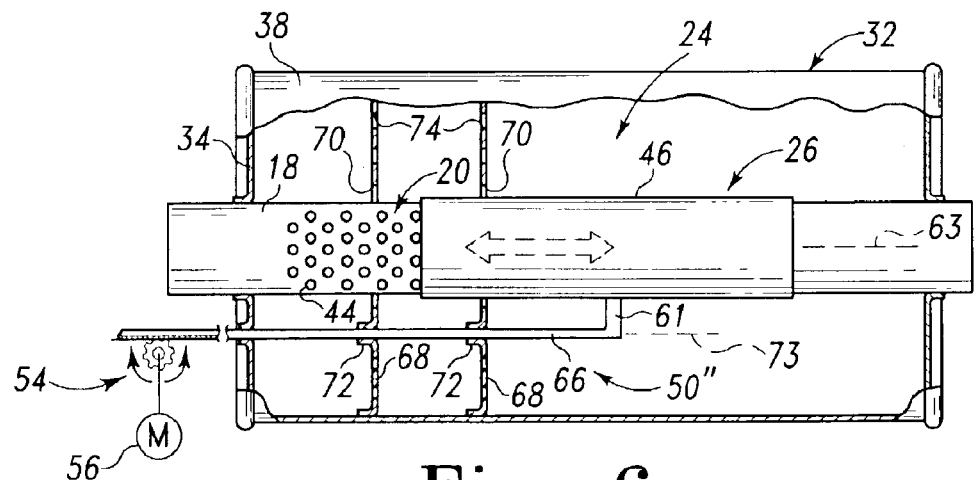
FIG. 6 is a view similar to FIG. 5 showing a second illustrative embodiment of a sleeve mover.
Figure 7:
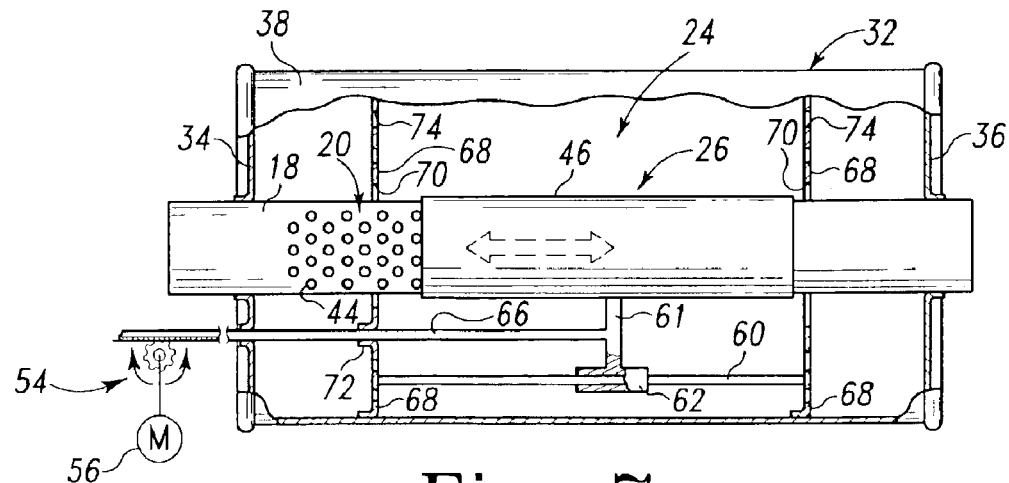
FIG. 7 is a view similar to FIGS. 5 and 6 showing a third illustrative embodiment of a sleeve mover.

Several illustrative examples of sleeve movers 50 are shown in FIGS. 5–7. These sleeve movers 50 are configured to cause sleeve 46 to move back and forth on tuning tube 18 along an axis that is coextensive with the central longitudinal axis 63 of tuning tube 18.

As shown in FIG. 5, sleeve mover 50' comprises a guide rod 60 mounted in a fixed position in housing 32 and a slidable collar 62 coupled to sleeve 46 by a post 61 and mounted for sliding movement on guide rod 60 to cause sleeve 46 to move relative to tuning tube 18 along an axis 63 parallel to a longitudinal axis 64 established by quick rod 60. A push-pull rod 66 is coupled at one end to motion converter 54 and at another end to post 61. In the illustration in FIG. 5, guide rod 60 is coupled at one end to first end wall 36 and is coupled at an opposite end to second end wall 38. It is within the scope of this disclosure to couple the ends or other portions of guide rod 60 to resonator housing 32 or other structures associated with resonator housing 32 to establish a fixed position of guide rod 60 within housing 32.

As shown in FIG. 6, sleeve mover 50" includes a post 61 coupled to a push-pull rod 66 which, in turn, is coupled to motion converter 54. Housing 32 further includes one or more interior baffles 68. Each baffle 68 is positioned to lie inside housing 32 between first and second end walls 36, 38. Baffle 68 is formed to include a first aperture 70 receiving tubing tube 18 (and also sized to receive sleeve 46) therein and a second aperture 72 receiving push-pull rod 66 therein to support rod 66 for movement along a longitudinal central axis 73 parallel to axis 63 of tuning tube 18. Each baffle 68 can be formed to include one or more other apertures 74 as shown, for example, in FIG. 6 to adjust the tuning frequency of the exhaust processor in a desired manner.

As shown in FIG. 7, sleeve mover 50''' includes a guide rod 60 mounted at one end to one interior baffle 68 and at another end to another interior baffle 68. The baffles 68 are positioned to lie in housing 32 between first and second end walls 36, 38 and in spaced-apart relation to one another. Push-pull rod 66 extends through aperture 72 formed in one of baffles 68 and interconnects motion converter 54 and post 61.

It is within the scope of this disclosure to couple a low-frequency tuning tube 76 to an outlet end 75 of tuning tube 18 as shown, for example, in FIG. 8. It is also within the scope of this disclosure to arrange a baffle 78 in housing 32 to partition the interior region of housing 32 to define a static tuning volume 24' between first end wall 34 and baffle 78 and a low-frequency static tuning volume 80 between baffle 78 and second end wall 36. Baffle 78 is coupled to side wall 38 to lie in a fixed position in the interior region of housing 32 in the embodiment shown in FIG. 8. Outlet end 75 (or other portion) of tuning tube 18 is arranged to extend through a central aperture 82 formed in baffle 78. Sleeve 46 is mounted on the portion of tuning tube 18 positioned to lie in static tuning volume 24' for movement relative to tuning tube 18 to open and close perforations 44.

Low-frequency tuning tube 76 is formed to include a first inlet opening 84 coupled in fluid communication to a second outlet opening 86 formed in outlet end 75 of tuning tube 18 as shown, for example, in FIG. 8. Low-frequency tuning tube 76 is also formed to include a first outlet opening 85 arranged to lie in low-frequency static tuning volume 80 to place low-frequency static tuning volume 80 in acoustic communication with acoustic waves associated with engine combustion product extant in low-frequency tuning tube 76. This "coupling" of tuning tubes 18, 76 allows engine combustion product flowing in a downstream direction 85 through tuning tube 18 to empty into a passageway 87 formed in low-frequency tuning tube 76 before it is discharged from tuning tube 76 through a second outlet opening 88 formed in an outlet end 89 (of tuning tube 76) extending through an aperture 42 formed in second end wall 36 as shown, for example, in FIG. 8.

Low-frequency tuning tube 76 comprises a large-diameter inlet section 90, a smaller diameter outlet section 89, and a necked-down conical transition section 93 interconnecting inlet and outlet sections 90, 89 as shown, for example, in FIGS. 8 and 9. As shown in FIGS. 8 and 9, inlet section 90 includes four circumferentially spaced-apart depressions 91 that are sized and located to mate with an exterior surface of outlet end 75 of tuning tube 18 to couple low-frequency tuning tube 76 to tuning tube 18 in the manner specified herein. Inlet section 90 further includes four tunnel sections 92 configured to define first outlet openings 85 and arranged so that each tunnel section 92 lies between a pair of adjacent depressions 91 as shown best for example, in FIG. 9.

In operation, low-frequency static tuning volume 80 provides a low-frequency Helmholtz resonance chamber. Low-frequency acoustic waves associated with engine combustion product passing through passageway 87 formed in tuning tube 76 are passed through first outlet openings 85 also formed in tuning tube 76 and then tuned in low-frequency static tuning volume 80. At the same time, sleeve 46 located in static tuning volume 24' can be moved by regulator operator 28 to cause acoustic waves of other frequency associated with engine combustion product passing through tuning tube 18 and its first outlet opening 20 defined by the field of perforations 44 to be tuned in static volume chamber 40'.

Figure 10:
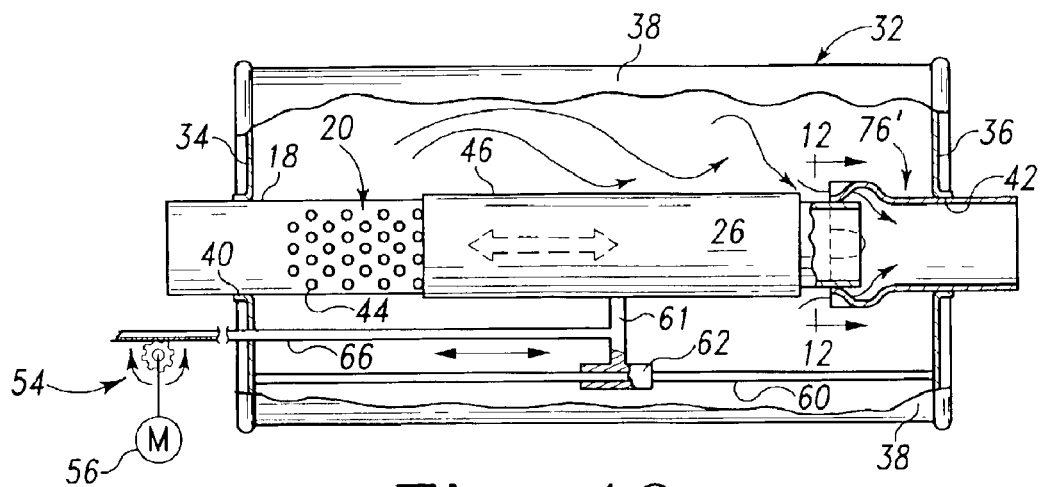
FIG. 10 is a view similar to FIG. 8 showing another illustrative exhaust processor including a low-frequency tuning exhaust tube coupled to an outlet end of a perforated tuning exhaust tube carrying a sleeve wherein the perforated tuning tube and the low-frequency tuning tube share a common static tuning volume provided in the exhaust processor housing.
Figure 11:
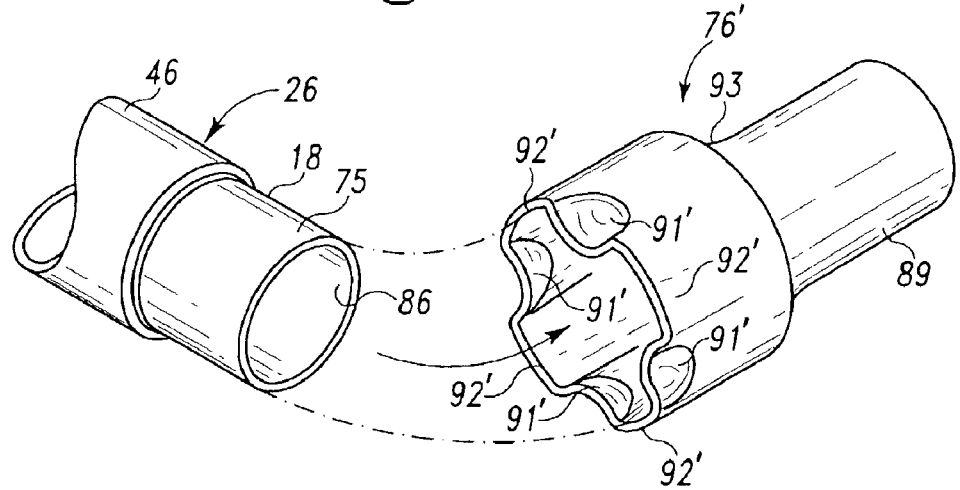
FIG. 11 is an enlarged perspective assembly view showing the outlet end of the perforated tuning tube before it is inserted into an inlet end of the low-frequency tuning tube.
Figure 12:
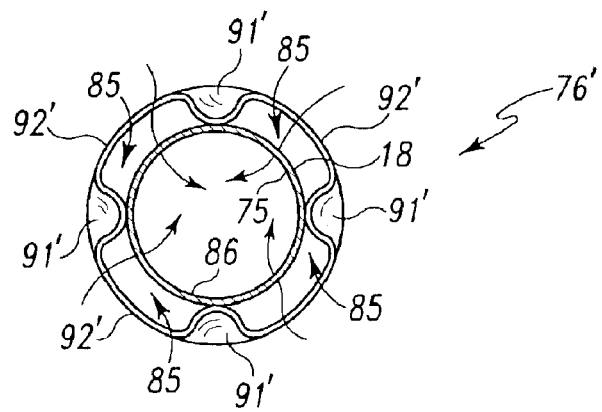
FIG. 12 is an enlarged sectional view taken along line 12—12 of FIG. 10 showing the outlet end of the perforated tuning tube mounted in the inlet end of the low-frequency tuning tube.

It is within the scope of this disclosure to use tuning tubes 18 and 76 in series without any interior baffle (such as baffle 78 shown in FIG. 8) as shown, for example, in FIG. 10 so that each of first outlet opening 20 of tuning tube 18 and first outlet opening 85 of low-frequency tuning tube 76 communicates with a single Helmholtz resonator chamber defined by static tuning volume 24 within housing 32. It is also within the scope of this disclosure to vary the size and shape of low-frequency tuning tube as can be seen in a comparison of tube 76 shown in FIGS. 8 and 9 and tube 76' shown in FIGS. 10–12 to alter the low-frequency tuning capability of such a tube.

In an embodiment shown in FIGS. 13–16, an interior baffle 110 is mounted in the interior region of resonator housing 32 for movement relative to side wall 38. Baffle 110 partitions the interior region of housing 32 to define a first static tuning volume 24' between first end wall 34 and baffle 110 and a second static tuning volume 24" between baffle 110 and second end wall 36. In the illustrated embodiment, a portion of the first outlet opening 20 defined by the field of perforations 44 is arranged to lie in each of the static tuning volumes 24' and 24". The first and second static tuning volumes 24' and 24" vary in size as baffle 110 is moved back and forth inside housing 32 as shown, for example, in FIGS. 13 and 14. Baffle 110 can be formed to include vent apertures 112 as shown, for example, in FIGS. 13–15 or without vent apertures as shown, for example, in FIG. 16 to provide the exhaust processor designer with flexibility to tune certain frequencies.

Figure 13:
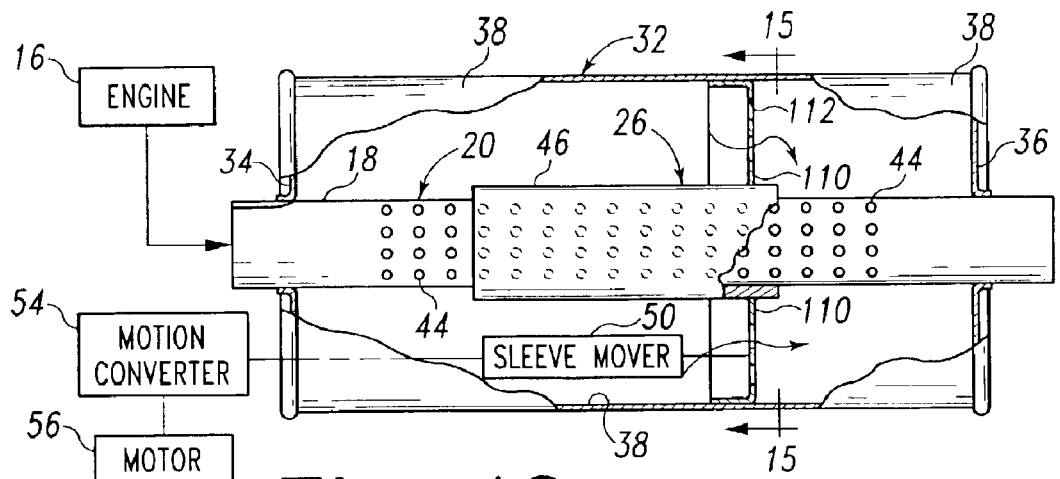
FIG. 13 is a side elevation view of another illustrative exhaust processor, with portions broken away, showing an exhaust processor housing partitioned by a movable baffle to define first and second static tuning volumes, a perforated tuning exhaust tube extending through the housing and a central aperture formed in the movable baffle, a sleeve coupled to the baffle to move therewith back and forth on the perforated tuning tube, and a sleeve mover coupled to the movable baffle.
Figure 14:
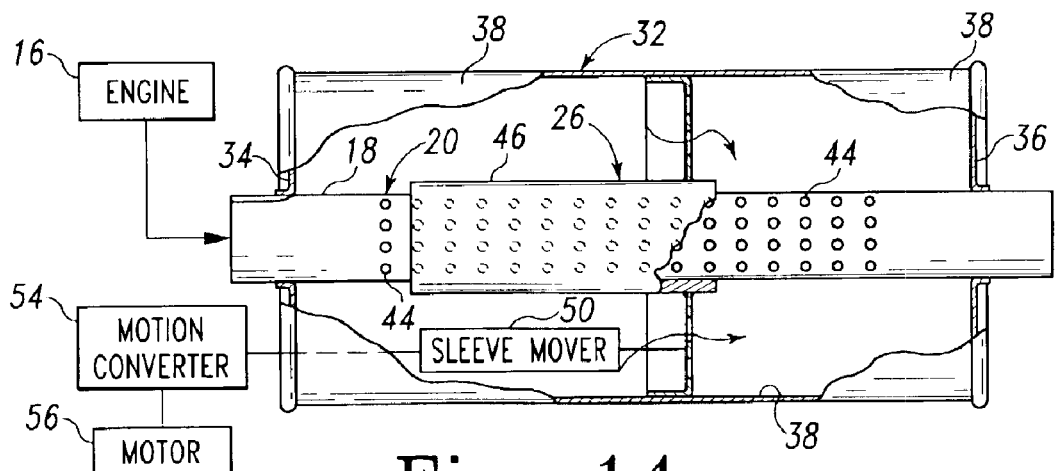
FIG. 14 is a view similar to FIG. 13 showing use of the sleeve mover to move the baffle in the housing to change the size of each of the first and second static tuning volumes and to move the sleeve on the perforated tuning tube so that fewer tuning tube perforations "open" into the upstream first static tuning volume and more tuning tube perforations open into the downstream second static tuning volume.
Figure 15:
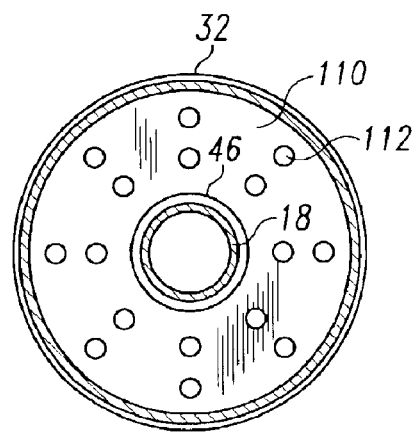
FIG. 15 is an enlarged sectional view taken along line 15—15 of FIG. 13 showing flow apertures formed in the movable baffle.
Figure 16:
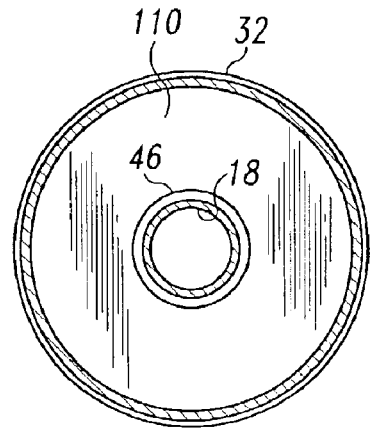
FIG. 16 is a view similar to FIG. 15 showing a movable baffle without any flow apertures.

Sleeve 46 is coupled to baffle 110 for movement therewith relative to tuning tube 18 and side wall 38 as also shown in FIGS. 13 and 14. Sleeve mover 50 extends into first static tuning volume 24' through an aperture formed in the housing 32 to move relative to housing 32 to control movement of baffle 110 and sleeve 46 relative to the tuning tube 18 extending through sleeve 46 and a central aperture formed in baffle 110.

Figure 17:
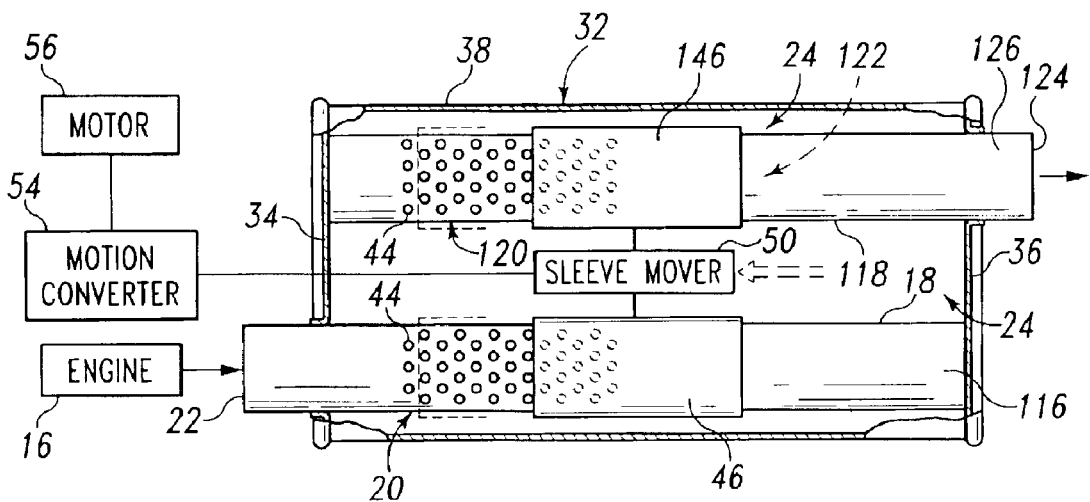
FIG. 17 is a side elevation view of another illustrative exhaust processor, with portions broken away, showing a perforated inlet tube, a perforated outlet tube, and a sleeve mover adapted to move sleeves mounted for sliding movement on the perforated inlet and outlet tubes.
Figure 18:
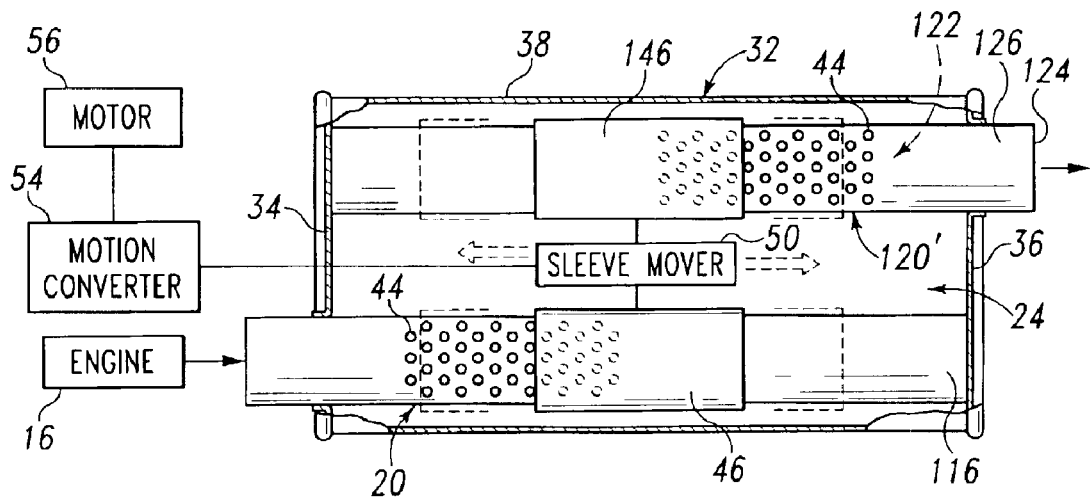
FIG. 18 is a view similar to FIG. 17 showing placement of the perforations in the outlet tube in a location different than that shown in FIG. 17.

Referring now to embodiments shown in FIGS. 17 and 18, it will be seen that it is within the scope of this disclosure to cause a second tube 118 to extend through an aperture 116 formed in second end wall 36 into static tuning volume 24 and lie, for example, in spaced-apart parallel relation to tuning tube 18. In this embodiment, tuning tube 18 is closed at its downstream end 116 so that all engine combustion product admitted into tuning tube 18 through inlet opening 22 is discharged into static tuning volume 24. Second tube 118 is formed to include an inlet opening 120 arranged to lie in static tuning volume 24 to allow engine combustion product therein to pass into a passageway 122 formed in second tube 118. That passageway 122 has an outlet opening 124 formed in outlet end 126 of second tube 126.

A second sleeve 146 is mounted for movement in static tuning volume 24 alongside tube 118 as shown, for example, in FIG. 17 to vary the size of inlet opening 120 formed in second tube 118. Sleeve mover 50 is coupled to each of sleeves 46, 146 to cause those sleeves 46, 146 to move together as a unit relative to tuning tubes 18, 118 in response to operation of motor 56 and motion converter 54. In the embodiment of FIG. 17, the inlet openings 20, 120 are located so that movement of sleeves 46, 146 in one direction minimize the size of both of those openings 20, 120 whereas, in the embodiment of FIG. 18, the inlet openings 20, 120 are located so that movement of sleeves 46, 146 in one direction minimizes the size of inlet opening 20 and maximizes the size of inlet opening 120. It is also within the scope of this disclosure to omit second sleeve 146.

Figure 19:
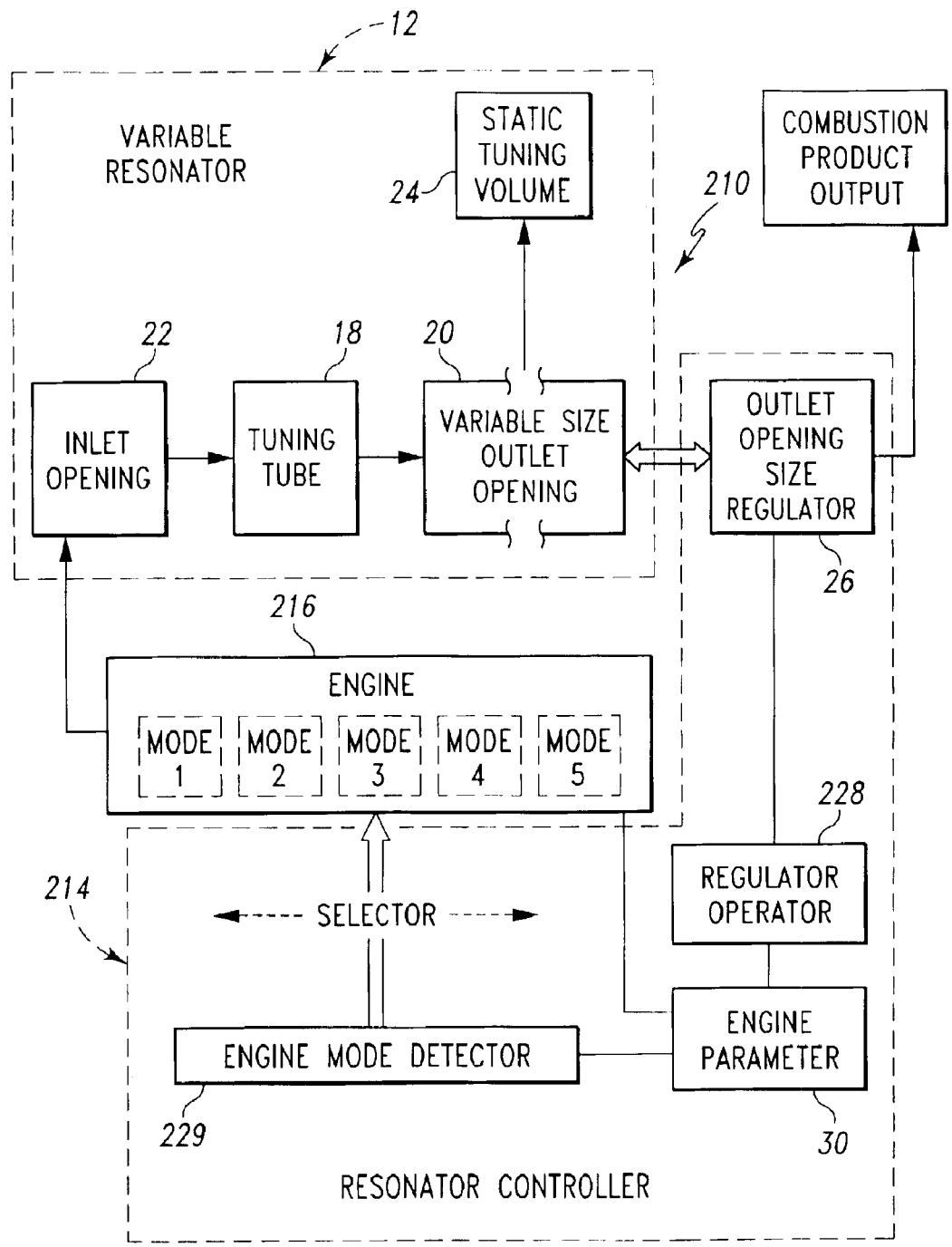
FIG. 19 is a diagrammatic view of another exhaust processor in accordance with the present disclosure showing a variable resonator and a resonator controller including an engine mode detector coupled to the engine and configured to detect the engine mode (e.g., 4, 5, 6, or 8 cylinder operation) selected by a vehicle operator or apparatus to regulate operation of the resonator controller using the engine parameter in a manner suited to the selected engine mode.

An exhaust processor 210 similar to exhaust processor 10 of FIG. 1 is shown diagrammatically in FIG. 19. In this embodiment, engine 216 is operable in five different modes, resonator controller 214 further comprises an engine mode detector 228 coupled to engine 216, and regulator operator 228 is configured to move outlet opening size regulator 26 based on real-time changes in engine parameter 30 (e.g., engine r.p.m.) in accordance with a predetermined criteria established in advance for each mode of operation of engine 216.

A wide variety of power trains (e.g., solenoid-controlled valve trains, camless engines, and cylinder deactivation technologies) pose tuning challenges to exhaust system designers due to increased complexity and cost associated with suitable tuning devices. The changing "operating mode" of an engine (e.g., an eight-cylinder engine could operate in four-, five-, or six-cylinder mode depending on the "cylinder activation or deactivation" algorithm established in the engine) could require an exhaust system designer to tune all of these individual engine operating modes with, potentially, several tuning elements. Given the packaging and performance constraints of vehicles, consumers would welcome an exhaust silencer able to respond actively to engine operating modes in accordance with the present disclosure so as to minimize the need for passive silencers for each engine operating mode. The resonator controller in accordance with the present disclosure is able to perform without increasing the restriction (back pressure) of the exhaust system and thus does not have a negative impact on engine power output.

The displacement of outlet opening size regulator 26 relative to variable size outlet opening 20 formed in tuning tube 18 is controlled via a muffler control unit (MCU) incorporated in or linked to regulator operator 228. The electronic map stores data for regulator displacement versus the required tuning frequency.

In operation, regulator operator 228 moves regulator 26 relative to tuning tube 18 as a function of one or more engine parameters (e.g., engine r.p.m.) according to a predetermined criteria established for each mode of operation of engine 216 based on the mode of operation of engine 216 sensed by engine mode detector 228. This predetermined criteria is established in the MCU in a format suitable for use in regulator operator 228.

Figure 20:
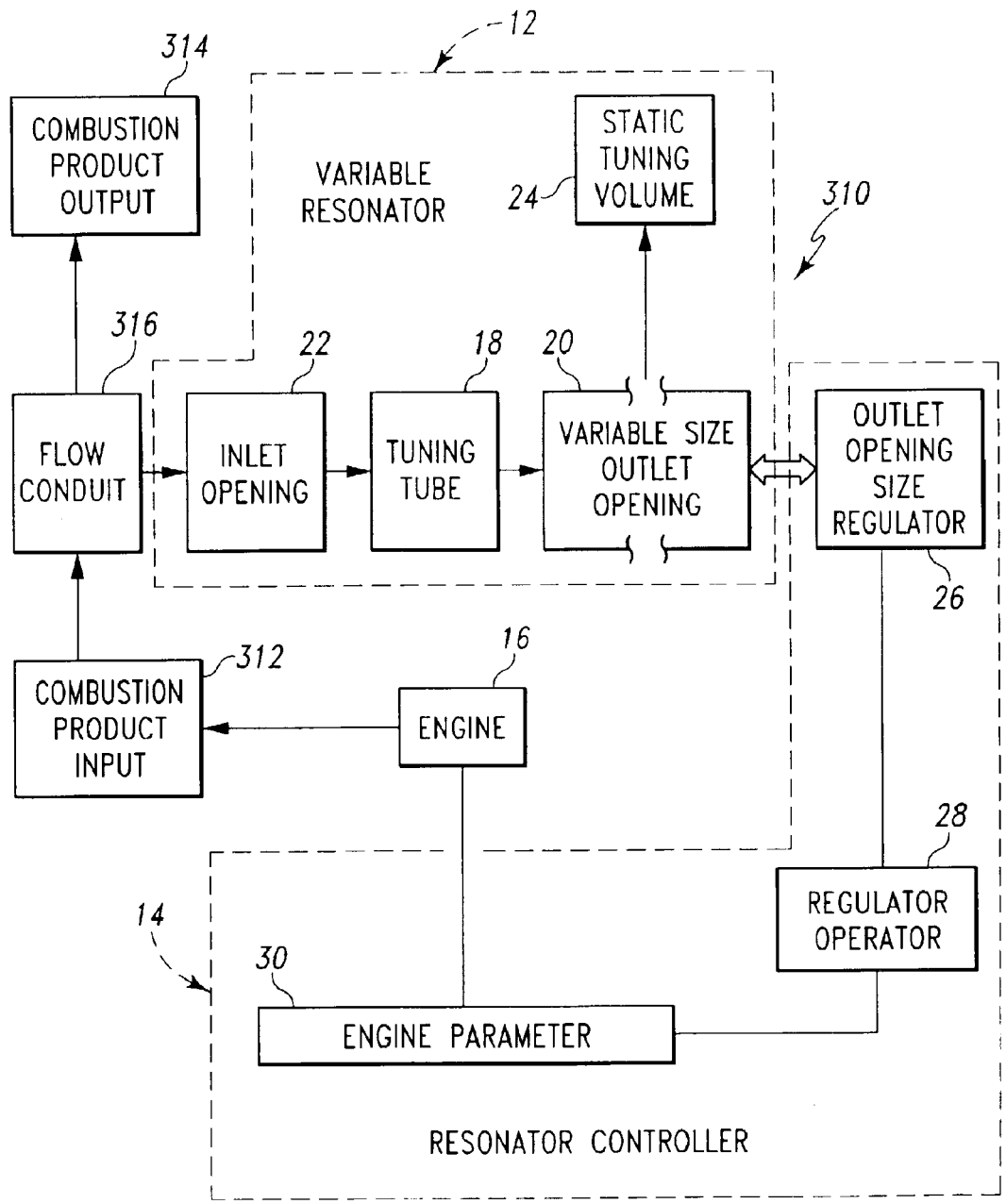
FIG. 20 is a diagrammatic view of yet another exhaust processor in accordance with the present disclosure showing a variable resonator arranged to communicate with combustion product flowing through a flow conduit located in an exhaust processor housing.
Figure 21:
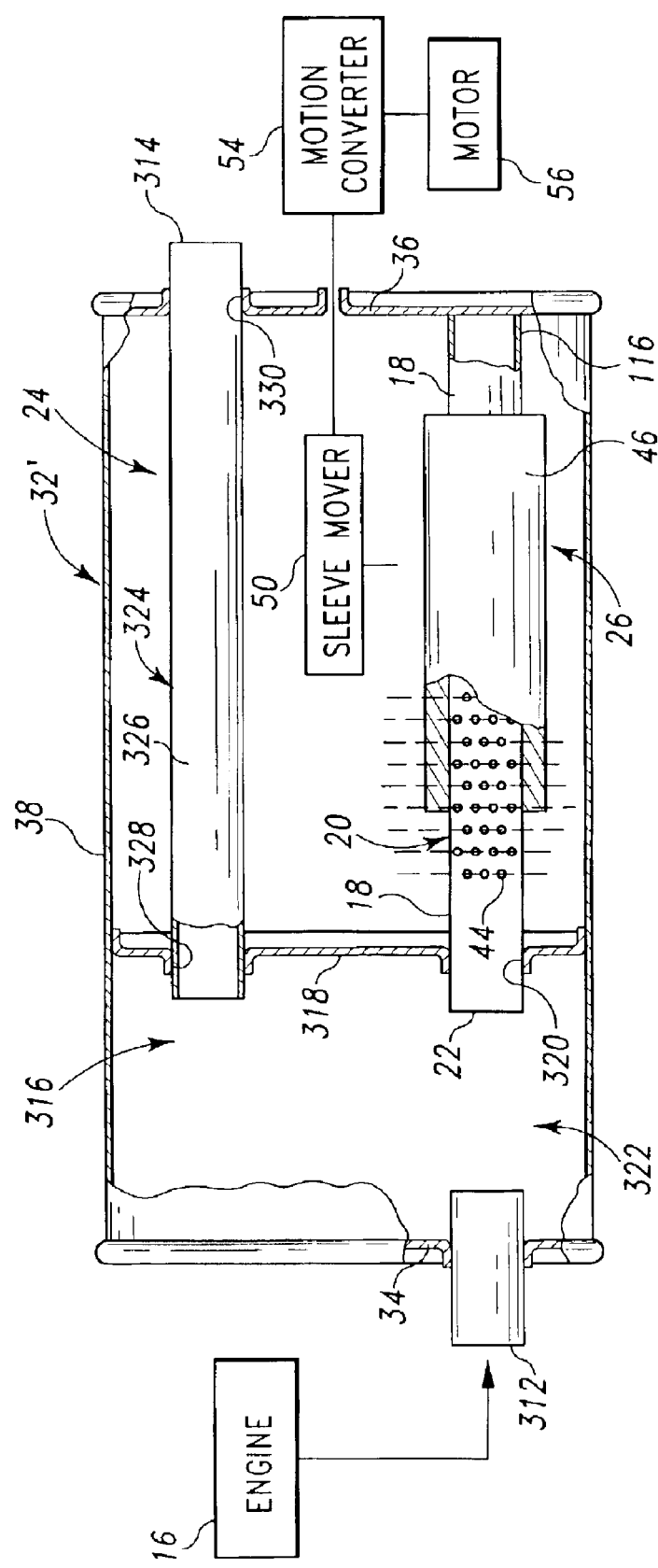
FIG. 21 is a side elevation view of an exhaust processor, with portions broken away, illustrative of the exhaust processor shown diagrammatically in FIG. 20.

An exhaust processor 310 similar to exhaust processor 10 of FIG. 1 is shown diagrammatically in FIG. 20 and illustratively in FIG. 21. In this embodiment, combustion product generated by engine 16 passes from a combustion product input 312 to a combustion product output 314 through a flow conduit 316. The inlet opening 22 of tuning tube 18 communicates with engine combustion product extant in flow conduit 316.

In the illustrative embodiment shown in FIG. 21, an interior baffle 318 is mounted in the interior region of resonator housing 32' and static tuning volume 24 is located between baffle 218 and second end wall 36. Tuning tube 18 has an inlet end extending through an aperture 320 formed in baffle 318 and sleeve 46 is movable in static tuning volume 24 on tuning tube 18 to open and close perforations 44 formed in tuning tube 18 and arranged to lie in static tuning volume 24. Flow conduit 316 includes an inlet section 322 bounded by first end wall 34, baffle 318, and a portion of side wall 38 located between first end wall 34 and baffle 318. Flow conduit 316 also includes an outlet section 324 coupled in fluid communication to inlet section 322 and defined by a tube 326 extending through static tuning volume 24. Tube 326 has an inlet extending through an aperture 328 formed in baffle 318 to receive engine combustion product from inlet section 322 and an outlet extending through an aperture 330 formed in second end wall 36.

A single muffler in accordance with the present disclosure could be used for tuning various engine configurations simply by altering the control logic. Such a muffler could also reduce or eliminate the need for multiple "passive" tuning elements within an exhaust system because "one" tuning chamber could be used to silence multiple frequencies. Such a muffler could be used for "camless" engines, where the engine could potentially switch to a four-, five-, six-, or eight-cylinder mode "on the fly." Such a muffler will potentially reduce muffler back pressure via eliminating multiple tuning chambers. Such a muffler will minimize exhaust system weight by "consolidating" multiple tuning elements into one.

Referring now to the embodiment shown in FIGS. 22–26, an exhaust processor 410 is different from the previous embodiments in that it comprises a cover 446 which is rotatable relative to a tuning exhaust tube 418, rather than being movable longitudinally therealong, to adjust the tuning frequency of the exhaust processor 410 to abate acoustic waves at the tuning frequency. The tube 418 is configured to conduct combustion product discharged from the engine 16 and defines an exhaust tube opening 420 for passage of acoustic waves associated with such combustion product therethrough. The cover 446 is mounted for rotation at least partially around the tube 418 to cover or uncover more or less of the opening 420 to affect communication of acoustic waves between the tube 418 and a housing 432 of the exhaust processor 410 to adjust the tuning frequency of the exhaust processor 410.

Figure 22:
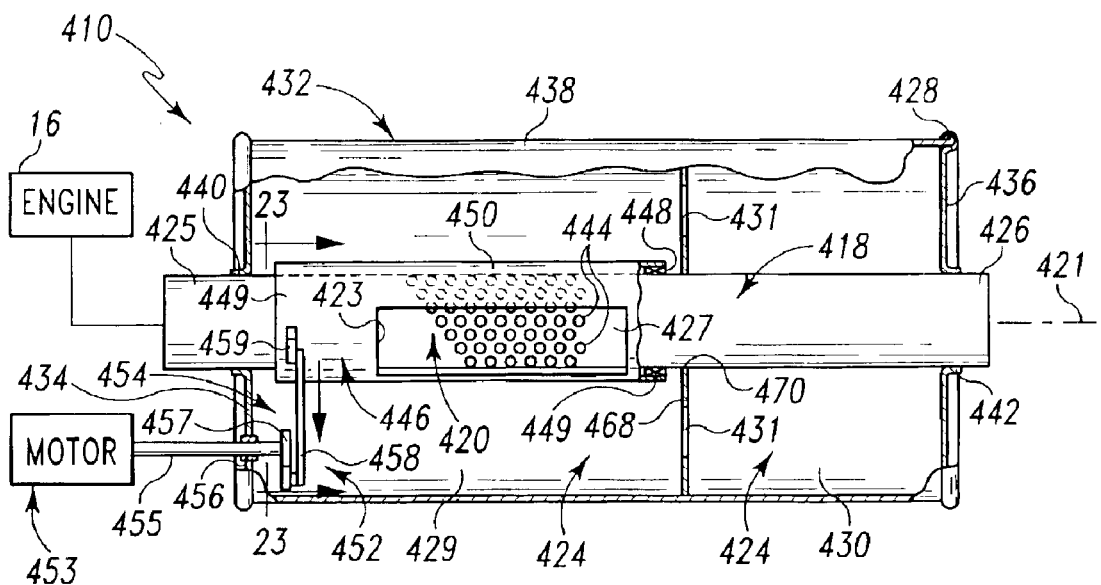
FIG. 22 is a side elevation view of another illustrative exhaust processor, with portions broken away, showing a rotatable cover in the form of a sleeve with a sleeve opening uncovering a first number of perforations defined by a tube surrounded by the sleeve to establish the tuning frequency of the exhaust processor at a first tuning frequency.
Figure 23:
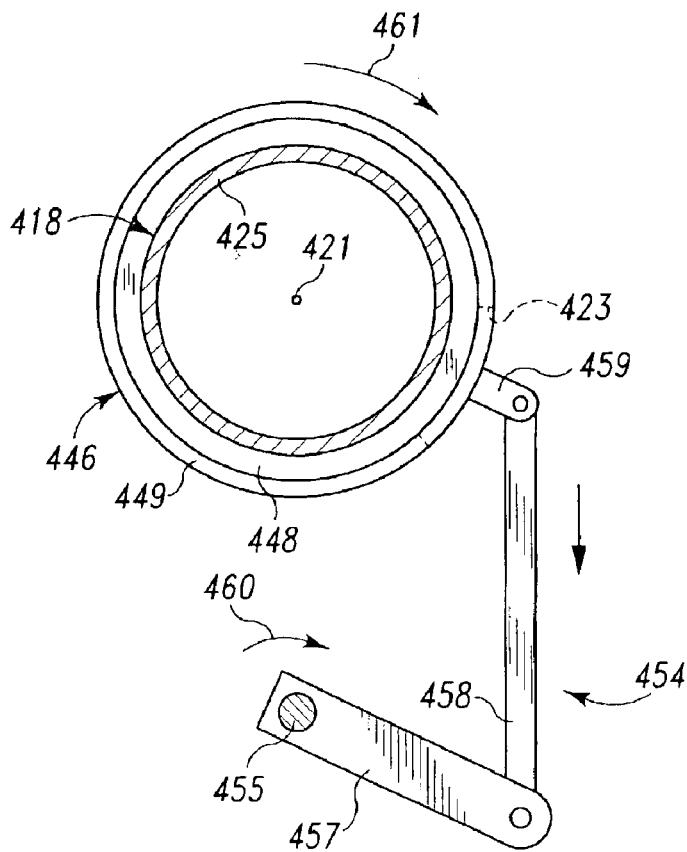
FIG. 23 is a sectional view taken along lines 23—23 of FIG. 22.
Figure 24:
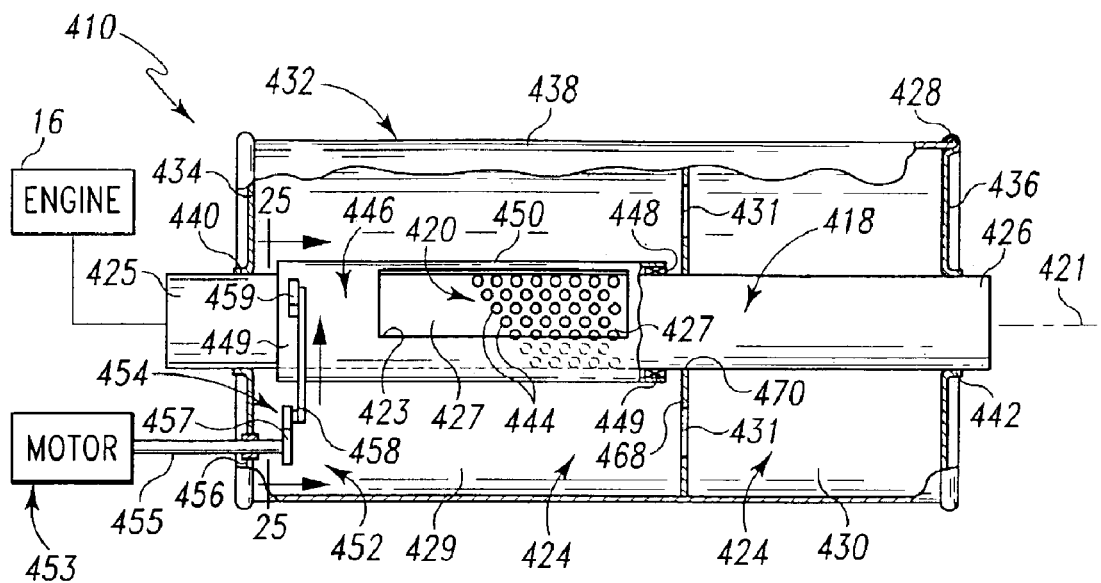
FIG. 24 is a side elevation view similar to FIG. 22 showing the sleeve after having been rotated to uncover a second number of perforations defined by the tube to establish the tuning frequency of the exhaust processor at a second tuning frequency.
Figure 25:
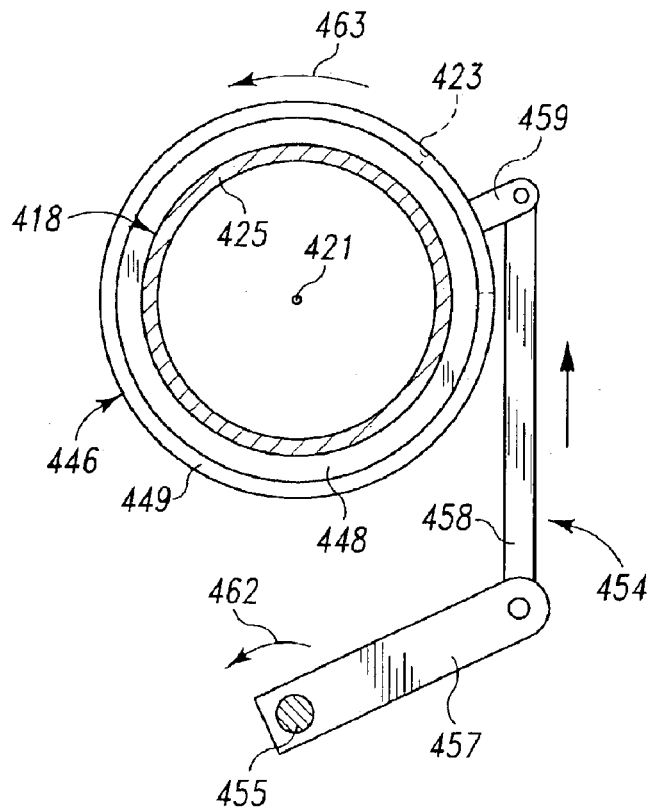
FIG. 25 is a sectional view taken along lines 25—25 of FIG. 24.

The cover 446 is configured, for example, as a sleeve. The sleeve 446 surrounds the tube 418 in coaxial relation therewith about an axis 421 and defines a sleeve opening 423. The exhaust tube opening 420 comprises, for example, a field of perforations 444, as shown for example in the development view of tube 418 in FIG. 26. The sleeve 446 is rotatable between a variety of positions to place the sleeve opening 423 over a number of the perforations 444 to establish the tuning frequency of the exhaust processor 410 at a desired tuning frequency. For example, the sleeve 446 is rotatable between a first position in which the sleeve opening 423 is placed over a first number of perforations 444, as shown in FIGS. 22 and 23, to establish the tuning frequency of the exhaust processor 410 at a first tuning frequency and a second position in which the sleeve opening 423 is placed over a second number of perforations 444, as shown in FIGS. 24 and 25, to establish the tuning frequency of the exhaust processor 410 at a second tuning frequency.

A pair of bearings 448 are positioned between the sleeve 446 and the tube 418 to facilitate rotation of the sleeve 446 relative to the tube 418. Each bearing 448 is positioned at one of the end portions 449 of the sleeve 446, as shown with respect to one of the bearings 448 in FIGS. 22 and 24. The sleeve opening 423 is defined by an intermediate portion 450 of the sleeve 446 which is positioned between the end portions 449.

A rotator 452 is configured to rotate the sleeve 446 relative to the tube 418 to adjust the tuning frequency of the exhaust processor 410. The rotator 452 comprises, for example, a motor 453 and a linkage 454 secured to the motor 453 and an outer surface of the sleeve 446, as shown in FIGS. 22–25. The drive shaft 455 of the motor 453 extends into the housing 432 through a bushing 456 mounted in an aperture of an inlet end wall 434 of the housing 432. The linkage 454 comprises, for example, a crank arm 457 fixedly secured to the motor drive shaft 455 for rotation therewith, a connector link 458 pivotally secured to the crank arm 457, and a link mount 459 pivotally secured to the link 458 and fixedly secured to the outer surface of the sleeve 446.

Rotation of the drive shaft causes the linkage to rotate the sleeve 446. For example, rotation of the drive shaft 455 in a direction 460 rotates the crank arm 457 therewith so as to cause the connector link 458 and the link mount 459 to rotate the sleeve 446 around the tube 418 in a direction 461, as shown in FIG. 23. As such, the sleeve opening 423 is placed over the first number of perforations 444, as shown in FIG. 22, to establish the tuning frequency of the exhaust processor 410 at the first tuning frequency. Rotation of the drive shaft 455 in a direction 462 opposite to direction 460 rotates the crank arm 457 therewith so as to cause the connector link 458 and the link mount 459 to rotate the sleeve 446 around the tube 418 in a direction 463 opposite to direction 461, as shown in FIG. 25. As such, the sleeve opening 423 is placed over the second number of perforations 444, as shown in FIG. 24, to establish the exhaust processor 410 at the second tuning frequency.

Figure 26:
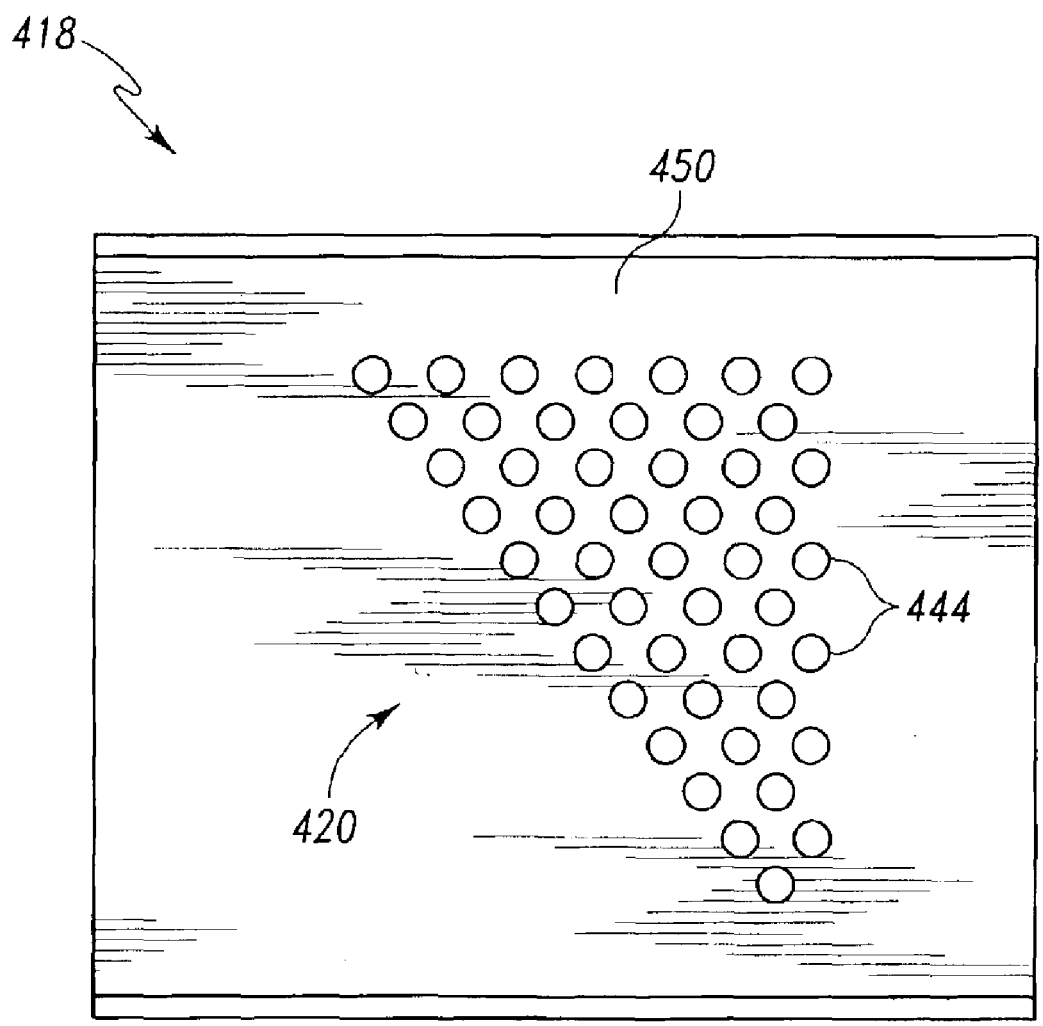
FIG. 26 is a fragmentary development view of the tube of FIGS. 22-25 showing a field of perforations defined by the tube.

The field of perforations 444 is configured so that the number of perforations 444 uncovered by the sleeve opening 423 changes upon rotation of the sleeve 446. One exemplary configuration of the field of perforations 444 is shown in FIG. 26. It is within the scope of this disclosure for the field of perforations 444 to be configured in a wide variety of ways.

The tube 418 is secured to and extends through the housing 432, as shown in FIGS. 22 and 24. In particular, an inlet end portion 425 of the tube 418 is secured to and extends through an inlet aperture 440 defined by the inlet end wall 434 of the housing 432. An outlet end portion 426 of the tube 418 is secured to and extends through an outlet aperture 442 defined by an outlet end wall 436. An intermediate portion 427 of the tube 418 is secured to and extends through an intermediate aperture 470 defined by an intermediate wall 468 inside the housing 432.

The end walls 434, 436 are secured to the side wall 438 to define a static tuning volume 424 inside the housing 432, as shown in FIGS. 22 and 24. Each end wall 434, 436 is secured to the side wall 438 by, for example, a lockseam 428, as shown with respect to the outlet end wall 436 in FIG. 22. The intermediate wall 468 divides the static tuning volume 424 into, for example, two chambers 429, 430 that can communicate through one or more apertures 431 defined by the intermediate wall 468. The intermediate wall 468 defines, for example, four such apertures 431 (two of which are shown in FIGS. 22 and 24) spaced about every 90° the axis 421. The static tuning volume 424 is configured, for example, as a Helmholtz resonator. It is configured to abate acoustic waves that enter it by passing from the tube 418 through the perforations 444 uncovered by the sleeve 446 and through the sleeve opening 423.

It is within the scope of this disclosure for the sleeve 446, rotator 452 and tube 418 to be used with a wide variety of exhaust processor configurations. For example, they may be used with any of the exhaust processor embodiments disclosed herein in place of the associated regulator operators and outlet opening size regulators to adjust the tuning frequency of such an exhaust processor. In addition, they may be used with any of the exhaust processor control schemes disclosed herein. For example, they may be used to adjust the exhaust processor tuning frequency in "real time" (e.g., as combustion product is discharged from engine 16 and advanced through the exhaust processor) in response to, for example, one or more engine parameters and/or one or more engine modes of operation.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features described herein. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. An exhaust processor having a tuning frequency for abatement of acoustic waves at the tuning frequency, the exhaust processor comprising:

a housing defining an aperture, an exhaust tube extending through the aperture into the housing and defining an exhaust tube opening positioned inside the housing for communication of acoustic waves between the housing and the exhaust tube, a rotatable cover external to the exhaust tube for at least partially covering the exhaust tube opening, and a rotator arranged for rotating the cover about a longitudinal axis of the exhaust tube at least partially around the exhaust tube over the exhaust tube opening so as to change the extent to which the cover covers the exhaust tube opening to thereby adjust the tuning frequency of the exhaust processor, wherein the cover comprises a sleeve that surrounds the exhaust tube in coaxial relation therewith and defines a sleeve opening to uncover at least a portion of the exhaust tube opening upon rotation of the sleeve, the exhaust tube opening comprises a plurality of perforations, and the sleeve opening uncovers a first number of the perforations to establish the tuning frequency of the exhaust processor at a first tuning frequency upon rotation of the sleeve to a first position and uncovers a second number of the perforations to establish the tuning frequency of the exhaust processor at a second tuning frequency upon rotation of the sleeve to a second position.

2. The exhaust processor of claim 1, further comprising a bearing positioned between the cover and the exhaust tube.

3. The exhaust processor of claim 1, wherein the rotator comprises (i) a motor comprising a drive shaft and (ii) a linkage secured to the drive shaft and the cover.

4. The exhaust processor of claim 1, wherein the housing defines a second aperture through which the exhaust tube extends out of the housing.

5. An exhaust processor having a tuning frequency for abatement of acoustic waves at the tuning frequency, the exhaust processor comprising:

an exhaust tube defining perforations for passage of acoustic waves therethrough, a rotatable cover external to the exhaust tube for at least partially covering the perforations, and a rotator arranged for rotating the cover about a longitudinal axis of the exhaust tube at least partially around the exhaust tube between a first position in which the cover covers a first number of the perforations to establish the tuning frequency of the exhaust processor at a first tuning frequency and a second position in which the cover covers a second number of the perforations to establish the tuning frequency of the exhaust processor at a second tuning frequency.

6. The exhaust processor of claim 5, wherein the cover comprises a sleeve that surrounds the exhaust tube in coaxial relation therewith and defines a sleeve opening that uncovers the first number of the perforations to establish the tuning frequency of the exhaust processor at the first tuning frequency upon rotation of the sleeve to the first position and uncovers the second number of the perforations to establish the tuning frequency of the exhaust processor at the second tuning frequency upon rotation of the sleeve to the second position.

7. The exhaust processor of claim 6, wherein the rotator is secured to the sleeve to rotate the sleeve between the first and second positions.

8. The exhaust processor of claim 7, wherein the rotator comprises (i) a motor comprising a drive shaft and (ii) a linkage secured to the drive shaft and the cover.

9. The exhaust processor of claim 5, further comprising a bearing positioned between the cover and the exhaust tube.

10. A method of operating an exhaust processor having a tuning frequency for abatement of acoustic waves at the tuning frequency, the method comprising the step of:

rotating a cover at least partially around the exhaust tube over a number of perforations defined by the exhaust tube to adjust the tuning frequency of the exhaust processor, wherein the cover is external to the exhaust tube, and the rotating step comprises rotating the cover from a first position in which the cover covers a first number of the perforations to establish the tuning frequency of the exhaust processor at a first tuning frequency to a second position in which the cover covers a second number of the perforations to establish the tuning frequency of the exhaust processor at a second tuning frequency.

11. The method of claim 10, wherein the cover comprises a sleeve that surrounds the exhaust tube in coaxial relation therewith and defines a sleeve opening, and the rotating step comprises rotating the sleeve at least partially around the exhaust tube to place the sleeve opening over a number of the perforations to adjust the tuning frequency of the exhaust processor.

12. The method of claim 11, wherein the step of rotating the sleeve comprises rotating the sleeve from the first position in which sleeve opening is placed over the first number of the perforations to establish the tuning frequency of the exhaust processor at the first tuning frequency to the second position in which the sleeve opening is placed over the second number of the perforations to establish the tuning frequency of the exhaust processor at the second tuning frequency.

13. The method of claim 10, wherein the rotating step comprises rotating the cover on a bearing positioned between the cover and the exhaust tube.

14. The method of claim 10, wherein the rotating step comprises the steps of operating a motor and moving a linkage secured to the motor and the cover to rotate the cover upon operation of the motor.

15. The method of claim 10, further comprising the step of advancing combustion product through the exhaust tube during the rotating step.

16. The exhaust processor of claim 1, wherein the rotator is secured to the cover to rotate the cover about the longitudinal axis without axial movement of the cover along the longitudinal axis.

17. The method of claim 10, wherein the cover is external to the exhaust tube, and the rotating step comprises rotating the cover about a longitudinal axis of the exhaust tube externally about the exhaust tube so as to change the extent to which the cover covers the perforations to thereby adjust the tuning frequency of the exhaust processor.

18. The exhaust processor of claim 5, wherein the cover and the perforations of the exhaust tube are located in a static tuning volume.

19. The exhaust processor of claim 18, wherein the static tuning volume in which the cover and the perforations are located is a Helmholtz resonator.

20. The exhaust processor of claim 5, wherein the perforations are arranged in a generally triangular pattern.

* * * * *